United States Patent
Guthrie et al.

[11] Patent Number: 5,978,869
[45] Date of Patent: Nov. 2, 1999

[54] ENHANCED DUAL SPEED BUS COMPUTER SYSTEM

[75] Inventors: Guy Lynn Guthrie, Austin, Tex.;
Richard Allen Kelley, Apex, N.C.;
Danny Marvin Neal, Round Rock;
Steven Mark Thurber, Austin, both of Tex.

[73] Assignee: International Business Machines Corporation, Armonk, N.Y.

[21] Appl. No.: 08/897,573

[22] Filed: Jul. 21, 1997

[51] Int. Cl.⁶ .............................. G06F 13/42; G06F 13/00; G06F 1/12

[52] U.S. Cl. .............................. 710/60; 710/100; 713/501

[58] Field of Search ........................... 395/280, 307–309, 395/880, 849; 710/60, 29, 62, 33, 104, 100, 127–129; 709/233; 713/501, 551

[56] References Cited

U.S. PATENT DOCUMENTS

| | | | |
|---|---|---|---|
| 4,931,924 | 6/1990 | Kageura .................................... | 395/500 |
| 5,058,054 | 10/1991 | Feldman .................................. | 395/849 |
| 5,386,517 | 1/1995 | Sheth et al. ............................. | 395/880 |
| 5,513,327 | 4/1996 | Farmwald et al. ....................... | 395/880 |
| 5,535,343 | 7/1996 | Verseput ................................... | 395/308 |
| 5,537,660 | 7/1996 | Bond et al. ............................... | 395/878 |
| 5,625,847 | 4/1997 | Ando et al. .............................. | 395/880 |
| 5,809,291 | 9/1998 | Munoz-Bustamante et al. ...... | 395/556 |
| 5,838,995 | 11/1998 | Chen et al. ............................... | 385/880 |

FOREIGN PATENT DOCUMENTS

| | | |
|---|---|---|
| 57-210495 | 12/1982 | Japan . |
| 7282000 | 10/1995 | Japan . |

*Primary Examiner*—Gopal C. Ray
*Attorney, Agent, or Firm*—Robert V. Wilder; Mark E. McBurney

[57] ABSTRACT

A methodology and implementing system 101 are provided in which a PCI bus is enhanced to operate at a plurality of data transfer speeds, including for example, 133 MHz in order to accommodate subsystem boards operating at higher frequencies, while at the same time allowing normal 66 MHz PCI clocking for devices designed to operate at the lower 66 MHz standard PCI speed. Master strobe MSTB 303, 403 and target strobe TSTB signals 309, 411 are generated in a handshaking methodology to determine if a master data transaction requesting device and a target data transaction device are designed to operate at the higher data transfer frequency. Higher frequency capable devices or boards are run at the increased frequency when both the requesting master and the selected target devices request the higher transfer rate, and standard devices or boards are run at the lower standard PCI frequency, while both master and target devices are coupled to and run from the same multi-speed PCI bus 125.

15 Claims, 4 Drawing Sheets

ENHANCED DUAL SPEED BUS COMPUTER SYSTEM

FIELD OF THE INVENTION

The present invention relates generally to information processing systems and more particularly to an improved dual speed bus architecture for computer systems.

BACKGROUND OF THE INVENTION

As computer systems and networked computer systems proliferate, and become integrated into more and more information processing systems which are vital to businesses and industries, there is an increasing need for faster information processing and increased data handling capacity. Even with the relatively rapid state-of-the-art advances in processor technology, and the resulting increased processor speeds, a need still exists for faster processors and increased system speeds. This is partially due to a growing number of computer applications and capabilities, including extensive network and rich graphics and display applications among others. As new applications for computers are implemented, new programs are developed and those programs are enriched with new capabilities almost on a daily basis. While such rapid development is highly desirable, there is a capability cost in terms of system speed.

Typically, new applications for computer systems, such as graphics enhancement subsystems or network subsystems, are embodied in separate adder boards or adaptor cards such as graphics adaptor boards. Each of the computer system enhancement devices is generally included on one or more circuit boards which are mounted in "slots" i.e. plugged into system motherboard connectors. As the number of such slots is increased, the bandwidth requirement for the I/O bus is also increased. The current 66 MHz 64 bit PCI architecture definition, for example, can accommodate a peak data transfer rate of 528 MB per second and can support up to two slots per PCI/I-O bus. Thus, there is a need for a higher performance capability to support a number of higher performance adapters.

SUMMARY OF THE INVENTION

A method and apparatus is provided in which a PCI bus is enhanced to operate at a plurality of data transfer speeds, in order to accommodate subsystem boards operating at higher frequencies, while at the same time allowing normal PCI clocking for devices designed to operate at the lower standard PCI speed. Master strobe and target strobe signals are generated in a handshaking methodology to determine if a master data transaction requesting device and a target data transaction device are capable of operating at the higher data transfer frequency. Higher frequency capable devices or boards are run at the increased frequency when both the requesting master and the selected target devices request the higher transfer rate, and standard devices or boards are run at the lower standard PCI frequency, while both master and target devices are coupled to and run from the same multi-speed PCI bus.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
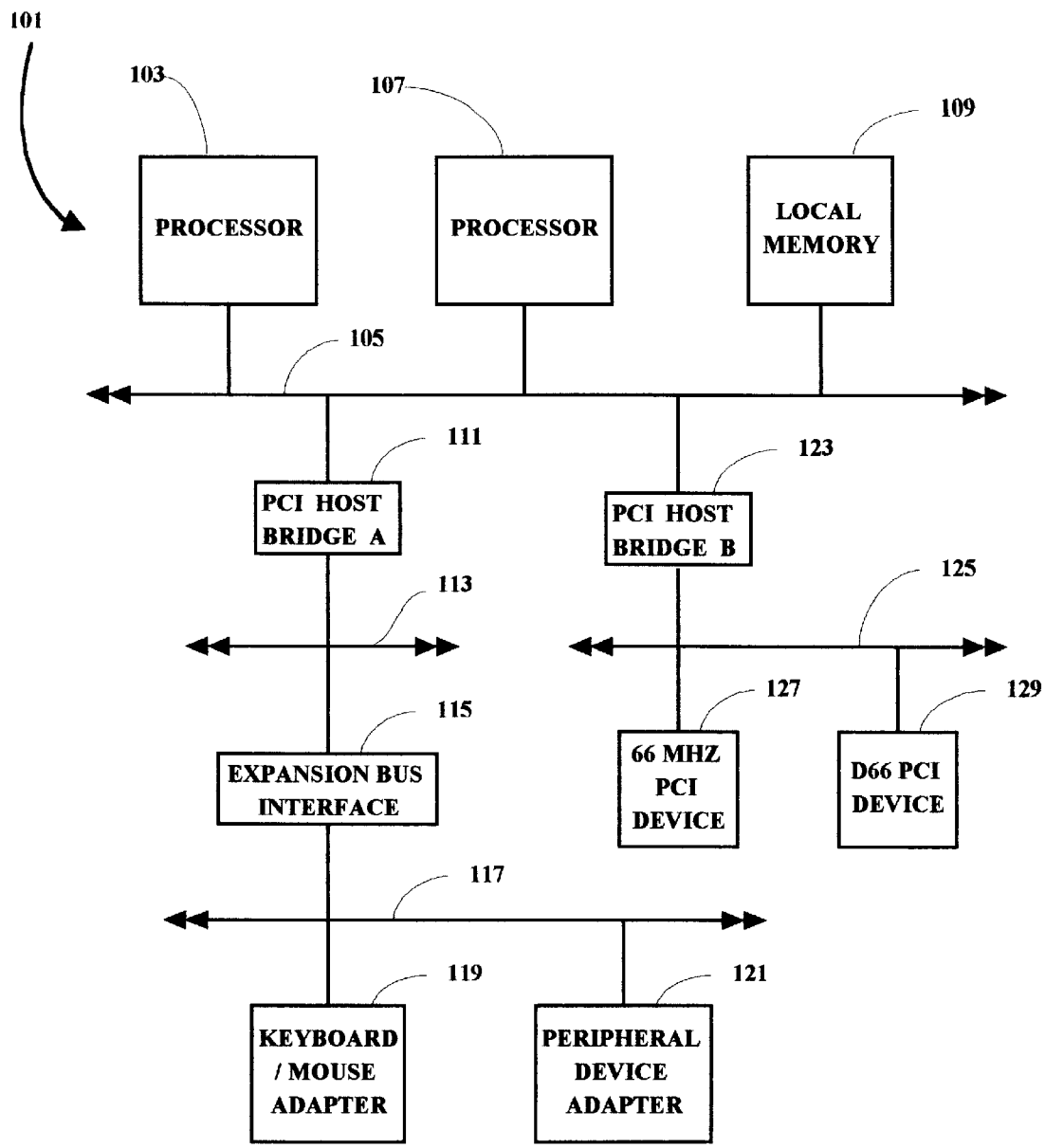
FIG. 1 is a block diagram of a computer system.

With reference to FIG. 1, the various methods discussed herein may be implemented within a typical computer system 101 which may include one or more computers or workstations in various combinations. An exemplary hardware configuration of a computer system which may be used in conjunction with the present invention is illustrated and includes a processor device 103, such as a conventional microprocessor, and a number of other units interconnected through a system bus 105, which may be any host system bus. The system bus may have one or more additional processors connected to the bus such as processor 107. It is noted that the processing methodology disclosed herein will apply to many different bus and/or network configurations. The bus 105, as well as any of the other busses illustrated, may be extended as shown to include further connections to other computer systems, workstations or networks, and other peripherals and the like. The computer system shown in FIG. 1 includes a local memory 109. A local bus controller and DRAM system memory (not shown) are also typically connected to the system bus 105.

The system bus 105 is connected through a PCI (Peripheral Component Interconnect) Host Bridge A circuit 111 to a second bus 113, which, in turn, is connected through an expansion bus interface 115 to a an expansion bus 117 in the present example. The expansion bus 117 may include connections to a keyboard/mouse adapter 119 and also to other peripheral device adapters such as peripheral device adapter 121. The exemplary embodiment illustrated also includes a PCI Host Bridge B 123 connecting the system bus 105 to a multi-speed or "D66" bus 125 which is implemented in accordance with the disclosed multi-speed methodology. The multi-speed bus 125 is connected, in the present example, to a 66 MHz PCI device 127 and also to a "D66" PCI device 129. The "D66" device in the present example, and the PCI Host Bridge, are capable of operating at double the speed of the 66 MHz device, and devices with this capability shall be hereinafter referred to as "D66" devices. The methodology herein disclosed provides a solution to the PCI bus speed limitation as hereinbefore described by defining means to enhance and extend the current 66 MHz PCI architecture definition, providing both 66 MHz and 133 MHz data rate capability. The D66 PCI bus definition described herein includes all of the protocol capabilities of the PCI standard, i.e. "PCI Local Bus Specification, Production Version, Revision 2.1, Jun. 1, 1995, and updates, plus additional D66 capabilities.

In accordance with the present disclosure, the data source device, i.e. the device which is providing information requested by a requesting device in the system, provides a data strobe signal with the requested data. The PCI Specification requires that each PCI device receives its own individual clock signal which is not bussed. That is, the master is the source of data and provides the data strobe signal during a write operation, and the target is the source of data and provides the data strobe signal during a read operation. The data strobe signal is then derived by both the master and the target from its 66 MHz clock signal, or from its 133 MHz clock signal, (whichever clock signal is utilized), for D66 operations. For D66 operations, the data is clocked or strobed at 133 MHz by being triggered on both edges of a 66 MHz strobe signal instead of the PCI implementation of only leading edge triggering. D66-capable devices connected to the D66 bus 125 are able to dynamically support either the 66 MHz or 133 MHz operation at the beginning of the data phase of a data transaction, i.e. either a read or a write operation. D66 devices are able to identify that they are D66-capable, i.e. capable of running at either 66 MHz or 133 MHz, in any of several ways such as by utilizing an un-architected configuration bit, although that particular method is not required. Currently reserved PCI bus pins are utilized for the data strobe line when both the controlling master and the selected target are D66 devices. Such bus pins are treated as reserved by D66 devices when not operating in the D66 mode. As used in the present disclosure, a "master" is a device requesting a data transaction such as a read or a write transaction, and a "target" is a device responding to the request by providing the data requested in a read, or by receiving the data being written to it from the master. In the present example, the D66 operation must transfer a minimum of 8 Bytes (32 bits) or 16 Bytes (64 bits) since D66 data transfers are clocked on both edges of the system clock. Both 133 MHz D66 operations and existing 66 MHz operations are dynamically supported on the same bus segment 125. There are several methods which may be implemented to accomplish that requirement. A preferred method is illustrated in FIG. 3 and FIG. 4 with reference to the timing signals shown in FIG. 2A and FIG. 2B.

Figure 2A:
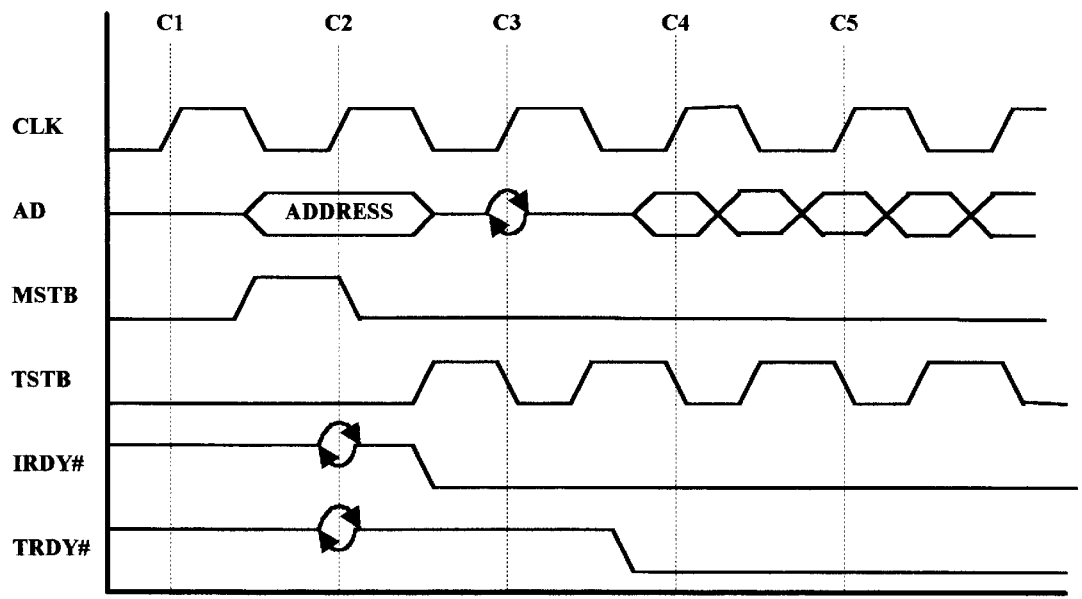
FIG. 2A is a timing chart illustrating the relationships between several of the signals generated in the exemplary embodiment for a basic D66 read transaction.
Figure 2B:
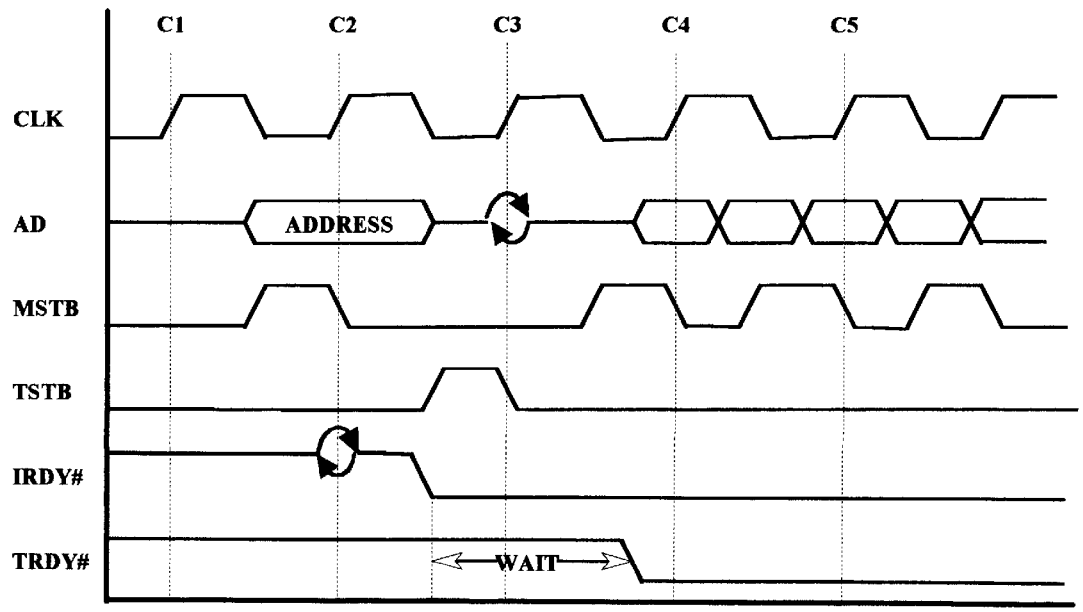
FIG. 2B is a timing chart illustrating the relationships between several of the signals generated in the exemplary embodiment for a basic D66 write transaction.
Figure 3:
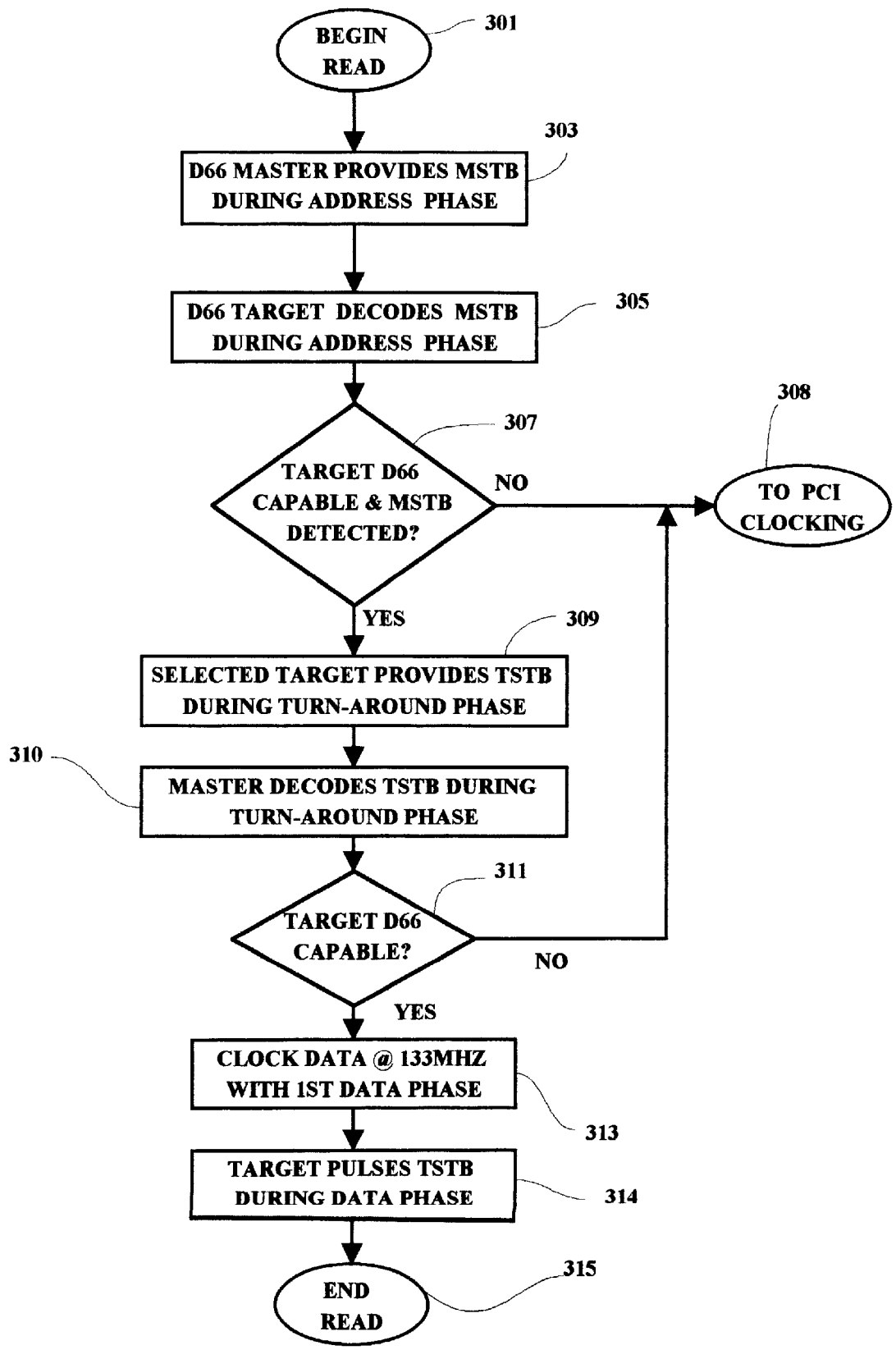
FIG. 3 is a flow chart showing an exemplary functional flow for a "read" operation of the exemplary embodiment.

In the timing chart of FIG. 2A, typical PCI signals such as the PCI 66 MHz clock signal CLK, and the address signal AD, including a bus turnaround phase and a data phase, are illustrated. Also shown are representations of the new master strobe signal MSTB and the target strobe signal TSTB during a READ function of a D66 data transfer operation. Similarly, FIG. 2B illustrates corresponding signals which are generated during a WRITE function.

As hereinbefore noted, two currently reserved PCI bus signal lines or pins are utilized for two new strobe signals, i.e. a master strobe signal MSTB and an target strobe signal TSTB. As illustrated in FIG. 3, a D66 read operation begins 301 by a master device outputting or pulsing 303 a predetermined first strobe signal or master strobe signal MSTB to the new MSTB line on the bus 125 during the address phase of a data transaction cycle. That signal MSTB indicates that the master is capable of operating in a D66 mode, i.e. at a data frequency of 133 MHz by clocking data on both edges of the strobe signal. A target device connected to the bus 125 would then decode the MSTB signal 305 and if the selected target is D66 capable 307, the target would then provide a predetermined second strobe signal or target strobe signal TSTB 309 to the appropriate bus line during a bus turnaround phase indicating that the target is capable of operating in the D66 mode, i.e. at 133 MHz data rate in the present example. If the target is not D66 capable 307, the data transaction proceeds in accordance with the default PCI 66 MHz speed 308. When the target device outputs a TSTB signal 309 during the turn-around cycle, the master decodes the TSTB 310 determining that the target is D66 capable, and prepares to read data at the 133 MHz rate, and if the selected target is D66 capable, the target provides a source synchronous TSTB signal with the "read" data at a data rate of 133 MHz. The data is read by the master device at the D66 frequency of 133 MHz 313 beginning with the first data phase of the transaction cycle, using TSTB to clock data off the bus 314, after which the particular read process is ended 315. If the MSTB is not decoded by the selected target device 311, the process defaults to normal PCI 66 MHz operation 308.

Figure 4:
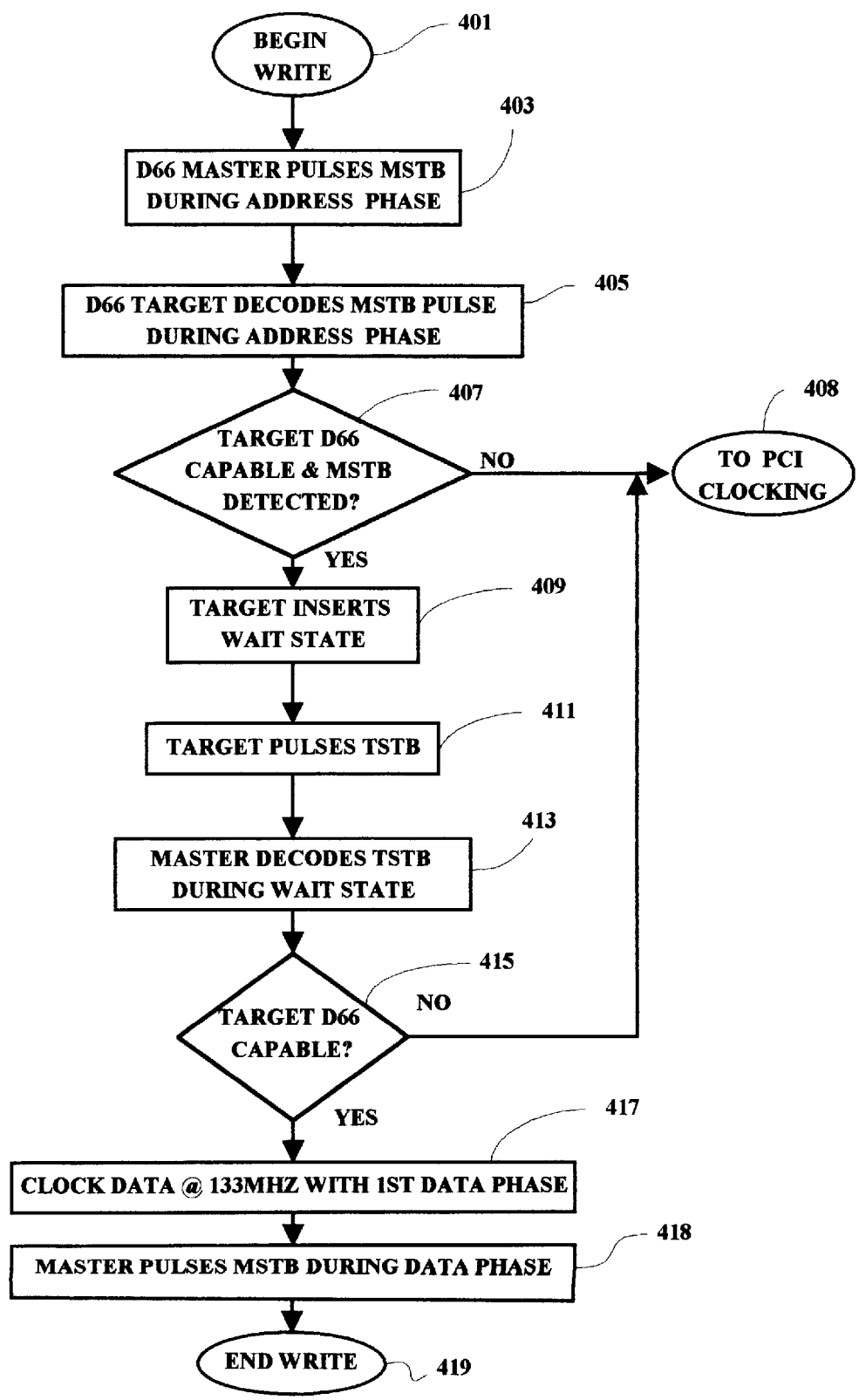
FIG. 4 is a flow chart illustrating a functional flow for a "write" operation of the exemplary embodiment.

A D66 write operation sequence is illustrated in FIG. 4. As shown, when the process initiates 401, the master device provides a master strobe signal MSTB 403 to the new MSTB line on the bus 125 during an address phase of a transaction cycle indicating that the master device is capable of D66 data transactions at 133 MHz in the present example. The D66 capable targets will then decode the MSTB signal during the address phase 405. If a D66 target device is selected 407, the target inserts a wait state 409 into the data transaction cycle and also provides a target strobe signal TSTB 411 during the wait state. The master then decodes the TSTB signal during the wait state 413 and if the target is D66 capable 415, the data is written or transferred from the master to the target at the D66 data rate of 133 MHz 417 beginning with the first data phase. The master then pulses the MSTB during the data phase 418, and the WRITE process ends 419. If either the master is not D66 capable 407, or the target is not D66 capable 415, selected 407 or the target is not D66 capable 415, then the write operation reverts to the PCI clocking at 66 MHz 408.

Another technique would use a shared strobe signal and use configuration bits to restrict to either D66 operation or normal PCI transfers on the bus 125 but not both. That approach is not preferred since it is not backward compatible to allow operation of mixed D66 and standard PCI 66 MHz devices. Another approach would use only one shared strobe line and multiplex master strobe and target strobe signals thereon. That approach would still allow system operation with mixed 66 MHz and D66 133 MHz devices, but is still not the preferred method since the shared strobe line would have to have turnaround clock cycles during the initial handshaking period, which, in turn, would require multiple wait states or starting with 66 MHz operation transfers and phasing over to D66 133 MHz transfers at a later time. Although there may be other variations regarding the handling of the initial handshaking process, the use of two separate strobe lines MSTB and TSTB as illustrated in the disclosed embodiment is the preferred approach.

During D66 133 MHz operations, pacing between data phases would not be implemented. Transfers would be blocked into minimum 32 byte blocks, and transactions can only be delayed at the beginning of a transfer or between 32 byte blocks. Peer-to-peer is supported for both 66 MHz and 133 MHz operations and configuration and I/O accesses are handled as standard 66 MHz operation.

Each PCI device receives a separate clock signal as the standard 66 MHz PCI bus does. The disclosed methodology supports pacing with IRDY# and TRDY# only between data blocks when utilizing data blocking. When utilizing optional data blocking, data transfers must begin on the beginning of the minimum block size, must transfer integer multiples of data blocks and must not pace except between 32 byte blocks. When the last block of data is less than 32 bytes, that transfer is handled in the normal non-blocking fashion. Pacing with IRDY# and TRDY# signals is allowed between data transfers when performing normal 66 MHz operations. The disclosed methodology supports optional synchronization type commands when performing D66 133 MHz operations.

The D66 133 MHz PCI data transfer methodology disclosed herein provides a number of enhancements over standard PCI 66 MHz processing in order to improve the data throughput achievable compared to the standard PCI architecture. The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for transferring data within a computer system between a master device and a target device across a PCI bus, the computer system having a data bus for accomplishing data transfer transactions between a first category of devices at a first data rate, said method being effective for selectively enabling data transfer transactions at a second data rate between a second category of devices capable of supporting data transfers at said second data rate, said second data rate being greater than said first data rate, said method comprising:

causing a master device of said second category of devices to provide a master strobe signal indicating that said master device is capable of supporting data transfers at said second data rate;

decoding said master strobe signal by said target device;

causing said target device to provide a target strobe signal in response to said master strobe signal if said target device is a second category device;

receiving said target strobe signal by said master device; and initiating a data transfer transaction between said master device and said target device across said PCI bus at said second data rate if both said master device and said target device are second category devices.

2. The method as set forth in claim 1, and further including:

initiating a data transfer transaction between said master device and said target device at said first data rate across said PCI bus if either said master device or said target device is a first category device.

3. A method for transferring data within a computer system between a master device and a target device, the computer system having a data bus for accomplishing data transfer transactions between a first category of devices at a first data rate, said method being effective for selectively enabling data transfer transactions at a second data rate between a second category of devices capable of supporting data transfers at said second data rate, said second data rate being greater than said first data rate, said method comprising:

causing a master device of said second category of devices to provide master strobe pulses at said second data rate;

detecting said master strobe pulses by the target device;

decoding said master strobe pulses by said target device during an address phase of said data transfer transactions;

determining category of said target device; and initiating a data transfer between said master device and said target device at said second data rate if said target device is a second category device.

4. The method as set forth in claim 3 and, after said decoding, said method further including:

providing target strobe pulses by said target device if said master strobe pulses are detected and said target device is a second category device; and decoding said target strobe pulses by said master device, prior to said initiating.

5. The method as set forth in claim 3 wherein said data transfer transaction is a data read transaction.

6. The method as set forth in claim 5 and further including providing said master strobe pulses by said master device during a data phase of said data transfer transactions.

7. The method as set forth in claim 3 wherein said data transfer transaction is a data write transaction.

8. The method as set forth in claim 7 and further including providing said target strobe pulses by said target device during a data phase of said data transfer transactions.

9. The method as set forth in claim 3 wherein said second data rate is an integer multiple of said first data rate.

10. The method as set forth in claim 9 wherein said second data rate is twice said first data rate.

11. A method for transferring data within a computer system between a master device and a target device, the computer system having a data bus for accomplishing data transfer transactions between a first category of devices at a first data rate, said method being effective for selectively enabling data transfer transactions at a second data rate between a second category of devices capable of supporting data transfers at said second data rate, said second data rate being greater than said first data rate, said method comprising:

causing a master device of said second category of devices to provide master strobe pulses at said second data rate;

detecting said master strobe pulses by the target device;

determining category of said target device;

inserting a wait state by said target device if said target device is a second category device and said master strobe pulses are detected;

providing target strobe pulses;

decoding said target strobe pulses by said master device during said wait state; and initiating a data transfer between said master device and said target device at said second data rate if said target device is a second category device.

12. The method as set forth in claim 11, and further including:

initiating a data transfer between said master device and said target device at said first data rate if said target device is said first category of device.

13. A method for transferring data within a computer system between a master device and a target device, the computer system having a data bus for accomplishing data transfer transactions between a first category of devices at a first data rate, said method being effective for selectively enabling data transfer transactions at a second data rate between a second category of devices capable of supporting data transfers at said second data rate, said second data rate being greater than said first data rate, said method comprising:

causing a master device of said second category of devices to provide master strobe pulses at said second data rate;

detecting said master strobe pulses by the target device;

providing target strobe pulses by said target device during a turn-around phase of said data transfer transactions;

decoding said target strobe pulses by said master device during said turn-around phase of said data transfer transactions;

determining category of said target device; and initiating a data transfer between said master device and said target device at said second data rate if said target device is a second category device.

14. An information processing system comprising:

a master device;

a target device; and a data bus, said information processing system being selectively operable for transferring data between said master device and said target device, said data bus being arranged for accomplishing data transfer transactions between a first category of devices at a first data rate, said data bus being further effective for selectively enabling data transfer transactions at a second data rate between a second category of devices capable of supporting data transfers at said second data rate, said second data rate being greater than said first data rate, said information processing system being effective for:

causing a master device of said second category of devices to provide master strobe pulses at said second data rate;

detecting said master strobe pulses by the target device;

decoding said master strobe pulses by said target device during an address phase of said data transfer transactions;

determining category of said target device; and initiating a data transfer between said master device and said target device at said second data rate if said target device is a second category device.

15. The information processing system as set forth in claim 14 and further including means arranged for initiating a data transfer transaction between said master device and said target device at said first data rate if either said master device or said target device is a first category device.

* * * * *